United States Patent
Huynh (10) Patent No.: US 9,824,310 B2
(45) Date of Patent: Nov. 21, 2017

(54) ARTICLE OF JEWELRY WITH HIDDEN NEAR FIELD COMMUNICATION (NFC) CHIP AND METALLIC BEZEL SUBSTANTIALLY SURROUNDING THE NFC CHIP AND USES THEREOF

(71) Applicant: Chi Huynh, San Dimas, CA (US)

(72) Inventor: Chi Huynh, San Dimas, CA (US)

( * ) Notice: Subject to any disclaimer, the term of this patent is extended or adjusted under 35 U.S.C. 154(b) by 222 days.

(21) Appl. No.: 14/589,961

(22) Filed: Jan. 5, 2015

(65) Prior Publication Data
US 2016/0196487 A1    Jul. 7, 2016

(51) Int. Cl.
A44C 17/02    (2006.01)
A44C 15/00    (2006.01)
A44C 25/00    (2006.01)
G06K 19/077   (2006.01)
A44C 9/00     (2006.01)
A44C 17/00    (2006.01)
H04W 4/00     (2009.01)

(52) U.S. Cl.
CPC ...... *G06K 19/07762* (2013.01); *A44C 9/0053* (2013.01); *A44C 17/005* (2013.01); *H04W 4/008* (2013.01)

(58) Field of Classification Search
CPC ... A44C 9/0053; A44C 17/005; A44C 17/006; A44C 17/007; A44C 17/008; A44C 17/0208; A44C 17/0216; A44C 17/02; A44C 25/001; A44C 25/007; H04W 4/008; G06K 19/07762
USPC ................. 63/1.13, 1.11, 4, 21, 23, 26, 40
See application file for complete search history.

(56) References Cited

U.S. PATENT DOCUMENTS

| | | | |
|---|---|---|---|
| 4,608,838 A * | 9/1986 | Gardner | A44C 17/0216 63/40 |
| 6,868,804 B1 | 3/2005 | Huisma et al. | |
| 7,596,967 B2 * | 10/2009 | Ostfeld | A44C 17/006 63/26 |
| 7,962,369 B2 | 6/2011 | Rosenberg | |
| 7,980,469 B2 | 7/2011 | Matsuo | |
| 8,131,645 B2 | 3/2012 | Lin | |
| 8,240,568 B2 | 8/2012 | Matsuo | |

(Continued)

FOREIGN PATENT DOCUMENTS

| | | |
|---|---|---|
| CN | 102204516 B | 12/2012 |
| CN | 102332106 B | 1/2014 |

(Continued)

OTHER PUBLICATIONS

PCT/US2016/027055 International Search Report and Written Opinion dated Jun. 30, 2016.

*Primary Examiner* — Jack W Lavinder
(74) *Attorney, Agent, or Firm* — Wagenknecht IP Law Group PC (57) ABSTRACT

An article of jewelry including a housing that permits passage of a near field communication signal, the housing characterized as having a lower layer joined to an upper layer; a near field communication (NFC) chip housed within the housing; a gemstone covering the upper layer of the housing; and a bezel substantially surrounding the outer perimeter of the housing and on a same plane as the NFC chip, wherein the bezel is formed from a highly electrically conductive material, further wherein the bezel permits near field communication with the NFC chip.

12 Claims, 7 Drawing Sheets

(56) References Cited

U.S. PATENT DOCUMENTS

| | | | |
|---|---|---|---|
| 8,280,305 B2 | 10/2012 | Tamura | |
| 8,768,250 B2 | 7/2014 | Ma | |
| 8,942,672 B2 | 1/2015 | Renard | |
| 9,042,817 B2 | 5/2015 | Tse | |
| 9,082,267 B2 | 7/2015 | Rosenberg | |
| 9,092,813 B2 | 7/2015 | Pappas | |
| 9,489,612 B2 * | 11/2016 | Boulby | G06K 19/07758 |
| 2004/0112087 A1 | 6/2004 | Bishop | |
| 2004/0250570 A1 | 12/2004 | Huynh | |
| 2007/0288249 A1 | 12/2007 | Rowe et al. | |
| 2008/0015013 A1 | 1/2008 | Gelman et al. | |
| 2008/0016913 A1 | 1/2008 | Ray et al. | |
| 2010/0147226 A1 | 6/2010 | Tsengas | |
| 2011/0248088 A1 | 10/2011 | Edouard et al. | |
| 2012/0215935 A1 | 8/2012 | Woods | |
| 2013/0234899 A1 | 9/2013 | Pope et al. | |
| 2013/0254159 A1 | 9/2013 | Thramann et al. | |
| 2014/0116085 A1 | 5/2014 | Lam | |
| 2014/0195675 A1 | 7/2014 | Silver | |
| 2014/0198037 A1 | 7/2014 | Leica et al. | |
| 2014/0298434 A1 | 10/2014 | Prchal | |
| 2015/0134552 A1 | 5/2015 | Engels | |
| 2015/0140927 A1 | 5/2015 | Chen | |
| 2015/0206046 A1 | 7/2015 | Aibazov | |
| 2015/0213734 A1 | 7/2015 | Glickman | |
| 2015/0249485 A1 | 9/2015 | Ouyang et al. | |
| 2015/0256386 A1 | 9/2015 | Palmer | |
| 2015/0263791 A1 | 9/2015 | Chein | |
| 2015/0294214 A1 | 10/2015 | Boulby | |
| 2015/0349556 A1 | 12/2015 | Mercando et al. | |
| 2016/0064804 A1 | 3/2016 | Kim et al. | |
| 2016/0066812 A1 | 3/2016 | Cheng et al. | |
| 2016/0112097 A1 | 4/2016 | Huynh | |

FOREIGN PATENT DOCUMENTS

| | | | | |
|---|---|---|---|---|
| JP | 2007091453 A | | 12/2007 | |
| JP | 3176725 U | | 7/2012 | |
| KR | 20030039941 A | * | 5/2003 | ......... A44C 17/0208 |
| WO | 2005015986 A2 | | 2/2005 | |
| WO | 2014/016609 A1 | | 1/2014 | |
| WO | 2016/089965 A1 | | 6/2016 | |

* cited by examiner

ARTICLE OF JEWELRY WITH HIDDEN NEAR FIELD COMMUNICATION (NFC) CHIP AND METALLIC BEZEL SUBSTANTIALLY SURROUNDING THE NFC CHIP AND USES THEREOF

TECHNICAL FIELD

The invention relates to jewelry and more specifically to an article of jewelry housing a near field communication (NFC) chip with a metallic bezel substantially surrounding the housed NFC chip.

BACKGROUND OF THE INVENTION

Jewelry is often given at special occasions, such as birthdays, anniversaries, vacations, and other memorable life events. Those that receive such gifts often wish to preserve and relive these memories; however, the moment itself is often not recorded or the recording is lost among numerous other recordings thereby losing its intended close association with the jewelry.

Radio frequency identification (RFID) is a technology commonly used for tracking purposes, often to replace bar codes. RFID tags contain an antenna and memory that stores data. Identifying or reading the data is accomplished using an RFID reader. RFID tags are widespread in the retail industry by helping stores keep track of inventory. RFID tags are also used in the cattle industry to monitor feeding and tracking potential spread of disease through recording and monitoring movement of individual animals over time. Near field communication (NFC) is a more finely honed version of RFID. It operates within a maximum range of about 4-10 cm and can operate in one- or two-way communication. NFC communication involves the modulation of a magnetic field between two devices, commonly referred to as an initiator and target. The initiator generates the RF field and the target modulates the field using power from the initiator. NFC-enabled features are now commonly integrated into smart phones. This technology is being adopted for financial transactions where touching a NFC smart phone to a NFC checkout terminal, instructs payment, thereby replacing credit cards. In addition, data can be shared directly between NFC smart phones by just tapping phones together.

RFID tags have also been incorporated into pearls. In WO2005/015986, a method of making a pearl is demonstrated where an RFID chip is fixed to the surface of the nucleus before the nucleus is inserted into the pearl oyster. This prevents identifying information specific to each pearl from being erased for tracking or classification purposes. Similarly, CN102332106B provides an approach to identify and manage pearls by embedding an RFID chip in a pearl for identification purposes. The RFID chip is added after boring into the pearl because the chip could be easily damaged if provided as part of a nucleus.

A challenge with NFC antenna design is that the performance of the NFC antenna is significantly degraded when positioning the NFC chip near metals. While RFID tags have been used to track pearls, pearls are nonconductive. That is, the nacre coating does not conduct electricity. To this end, the mere substitution of the pearl's nacre coating with a highly electrically conductive metal, such as silver or gold, is not appropriate for an NFC embedded chip since it prevents communication between an NFC chip and an NFC enabled device.

Traditional jewelry design includes a gemstone mounted to a bezel. In further designs, a gemstone is mounted to a gemstone setting (also referred to as a bezel setting) and the bezel setting is affixed to a bezel. The bezel is then joined to different elements to define the type of jewelry. For instance, adding the bezel to a chain can form a necklace or bracelet with pendant and soldering the bezel to a hoop can form a ring. In conventional jewelry design the bezel is formed from a metal such as a precious metal. This is frequently gold or silver. However, it has been found that positioning an NFC chip within a same plane as a surrounding jeweler's metal, such as gold or silver prevents communication between the NFC chip and NFC enabled device. Accordingly, there is a need to develop a new article of jewelry that permits NFC communication between an embedded NFC chip and an NFC enabled device and that incorporates precious metals such as silver and gold.

SUMMARY OF THE INVENTION

The invention addresses the need to house an NFC chip within an article of jewelry having a bezel formed from a highly electrically conductive metal and aligned along a same plane as the NFC chip. This permits articles of jewelry having an NFC housed chip to be incorporated into a variety of jewelry designs. In particular, this is accomplished through an article of jewelry incorporating a silver or gold bezel that substantially surrounds the NFC chip, but lacks an NFC interfering loop around the NFC chip thereby permitting near field communication. To this end, an article of jewelry is developed, which includes a housing that permits passage of a near field communication signal; a near field communication (NFC) chip housed within the housing; a gemstone, preferably at least semitransparent, covering the housing; and a bezel substantially surrounding the outer perimeter of the housing and extending along a same plane as the NFC chip, wherein the bezel is formed from a highly electrically conductive material, further wherein the bezel permits near field communication with the NFC chip.

The near field communication chip is housed or sandwiched between upper and lower layers defining the housing. The lower layer or base layer may include an ascending skirt or ridge at its perimeter or circumference to define an inner recess or mounting surface that is generally planar. The upper layer is preferably planar, covers the NFC chip and is preferably affixed to the lower layer, such as along the ascending skirt or ridge. In other embodiments the upper layer is recessed within the recess or mounting surface and flush or about flush with the top of the ascending skirt or ridge. In preferred embodiments, the upper layer adds to the jewelry design by not only hiding the NFC chip due to its opacity but also by being formed from a precious or semiprecious material that can be viewed at least partially through the transparent or semi-transparent gemstone cover. In some embodiments, the upper layer is a planar slice of an opaque gemstone, such as an agate. In a preferred embodiment, the upper layer is formed from mother of pearl and viewed through the gemstone.

The gemstone covering the housing permits at least partial viewing of the upper layer. The gemstone may be a precious gem or a semiprecious gem. In some embodiments the gemstone is selected from the group consisting of an amethyst, an aquamarine, an apatite, a citrine, an emerald, a garnet, a quartz, a iolite, a moissanite, a peridot, a ruby, a sapphire, a tanzanite, a topaz, and a zircon. Preferably the bottom of the gemstone cover is flat to provide a complementary surface for good adhesion to the underlying upper layer of the housing and/or optionally the base or lower layer of the housing. In some embodiments, the outer surface of the covering gemstone is faceted. In other embodiments, the gemstone is smooth and not faceted.

The bezel provides a metallic surround and provides a structure for joining the article of jewelry to complementary jewelry items, such as a chain or rope to form a necklace or appropriate mounts to form a ring, an earring, and other items of jewelry. Preferably, the highly electrically conductive material used to form the bezel is a metal or metal alloy. More preferably the conductivity is on the order of magnitude of $10^7$ S/m. Most preferably, the material is silver or gold. In a preferred embodiment, opposing ends of the bezel are spaced or gapped apart from one another to prevent formation of an NFC interfering loop that interferes with communication with the housed NFC chip. In a further preferred embodiment, opposing ends of the bezel are flanged outward and each opposing flange is bored to form a throughbore. Positioned along the inside of each opposing throughbore is a collar formed from a less conductive second material, such as a plastic. To this end a gold or silver chain be threaded through opposing throughbores and separated from direct contact with the gold or silver of the bezel by the collars, thereby maintaining near field communication with the housed NFC chip. In another embodiment, opposing ends of highly electrically conductive material are joined by a nonconductive material or much less conductive material thereby forming a continuous bezel that lacks an NFC interfering loop.

In further embodiments the gemstone covering is bored and a gemstone setting extends into the gemstone to provide a structure for mounting a second gemstone. Preferably, a second gemstone is mounted to the gemstone setting. Non-limiting examples of suitable gemstones for mounting to the gemstone setting include precious and semi-precious gemstones, such as those selected from the group consisting of an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, a iolite, a jadcite, a kupzite, a lapis lazuli, a moonstone, a malachite, a moamite, an onyx, an opal, a peridot, a red corundum, a ruby, a sardonyx, a sapphire, a spessartime, a sphene, a spinel, a star ruby and sapphire, a sunstone, a tanzanite, a tiger eye, a tourmaline, a topaz, a turquoise, a tsavorite, and a zircon.

BRIEF DESCRIPTION OF THE DRAWINGS

Embodiments of the invention can be better understood with reference to the following drawings, which form part of the specification and represent preferred embodiments. The components in the drawings are not necessarily to scale, emphasis instead being placed upon illustrating the principles of the invention. And, in the drawings, like reference numerals designate corresponding parts throughout the several views.

DETAILED DESCRIPTION OF PREFERRED EMBODIMENTS

For clarity of disclosure, and not by way of limitation, the invention is discussed according to different detailed embodiments; however, the skilled artisan will recognize through the guidance herein that features of one embodiment can be combined with other embodiments and therefore such combinations are within the intended scope of the invention.

Unless defined otherwise, all technical and scientific terms used herein have the same meaning as is commonly understood by one of ordinary skill in the art to which this invention belongs. If a definition set forth in this document is contrary to or otherwise inconsistent with a definition set forth in the art, the definition set forth in this document prevails over a contradictory definition.

The term "opaque" as used herein refers to the inability to see through a material across the visible spectrum. An "opaque layer" is not transparent. An "opaque layer" may be reflective. The term "opacity" refers to an element characterized as being "opaque."

The term "highly electrically conductive material" or "highly conductive material" as used herein refers to materials that conduct electricity to a high degree. The most electrically conductive element is silver, followed by copper and gold, each of which is highly electrically conductive. The SI unit for conductivity S/m. A "highly electrically conductive material" is about $10^7$ S/m.

The term "nonconductive materials" or "lesser conductive materials" as used herein refers to a material that if completely surrounding a NFC chip would not prevent near field communication with the NFC chip. Nonconductive materials are also termed insulators. Nonconductive materials can include various polymers including plastics, rubbers, glass and ceramics. Lesser conductive materials can include titanium or titanium alloy as used in the jewelry industry.

The term "NFC interfering loop" as used herein refers to a loop of material that prevents near field communication with a surrounded NFC chip.

The term "near field communication chip" or "NFC chip" as used herein refers to an unpowered chip capable of acting as a passive target under near field communication standards as known in the electronic communication arts. The "near field communication signal" typically operates within a distance of about 4-10 cm or less and at a frequency of about 13.56 MHz. Near field communication operates using electromagnetic induction between two loop antennas located within each other's near field, effectively forming an air-core transformer between an initiator and target. More specifically an initiator device provides a carrier field, and the target device answers by modulating the existing field. Thus the NFC chip draws its operating power from the initiator-provided electromagnetic field. An "NFC enabled device" as used herein refers to a device such as a smart phone or a tablet computer that acts as an initiator to power the NFC chip. NFC chips include a loop antenna and memory that currently stores between about 96 bytes and 4 MB. NFC chips can be read only but are preferably rewritable. Reading and writing to an NFC chip can be performed using an NFC enabled device loaded with NFC software. The term "NFC chip" is intended to encompass current near field communication standards as well as further improvements that can operate in connection with remaining elements that form the article of jewelry.

The term "substantially surrounding" or "substantially around the outer perimeter" as used herein refers to an extension that surrounds between 85% and less than 100%, more preferably 90%-99.9% of the outer perimeter or circumference. In further embodiments, 90%-95% of the outer perimeter or circumference of the housing is surrounded by the highly electrically conductive material of the bezel. In some embodiments, at least 95% of the outer perimeter or circumference of the housing is surrounded by the highly electrically conductive material of the bezel. In further embodiments, at least 96% of the outer perimeter or circumference of the housing is surrounded by the highly electrically conductive material of the bezel. In further embodiments, at least 97% of the outer perimeter or circumference of the housing is surrounded by the highly electrically conductive material of the bezel. In further embodiments, at least 98% of the outer perimeter or circumference of the housing is surrounded by the highly electrically conductive material of the bezel. In further embodiments, at least 99% of the outer perimeter or circumference of the opaque layer is surrounded by the highly electrically conductive material of the bezel. In preferred embodiments, the highly electrically conductive material of the bezel does not surround 100% of the perimeter or circumference of the housing.

The term "distance of communication" as used herein refers to the maximum distance in which an NFC enabled device can receive instructions or a message from an NFC chip. The "distance of communication" is typically less than 10 cm and preferably 4 cm or less.

Referring collectively to FIGS. 1-4, an article of jewelry 10 is provided that permits NFC communication with an NFC enabled device. The article of jewelry includes a housing that permits passage of a near field communication signal and is characterized as having a lower layer 12 joined to an upper layer 16; a near field communication (NFC) chip 14 housed between the upper 16 and lower 12 layers of the housing; preferably a transparent or semitransparent gemstone 18 covering the upper layer 16 of the housing 18; optionally a gemstone setting 20 extending into the gemstone 18; and a bezel 22 substantially surrounding the outer perimeter 12a of the upper 16 and lower layers 12, where the bezel 22 is formed from a highly electrically conductive material, and where the bezel 22 permits near field communication with the NFC chip 14. The bezel 22 extends along a same plane as the NFC chip 14.

By providing an article of jewelry 10 with a housed NFC chip 14 that is rewritable, an article of jewelry 10 has been developed having hidden memory that can be rewritten numerous times to couple memories or personal expressions that can be enjoyed while viewing the jewelry 10. As will become evident, the jewelry 10 will be able to communicate with mobile devices, such as NFC-enabled mobile phones having a suitable software application so that personal communication or expressions can be enjoyed in concert with the jewelry 10. NFC communication is accomplished by positioning the article of jewelry 10 next to or against the NFC enabled device. Once positioned, the NFC enabled device initiates communication with the NFC chip 14 through a magnetic field. The magnetic field powers the passive NFC chip 14 which permits responsive communication. The NFC chip 14 communicates a message to the NFC enabled device, which may launch an application opening an image, video or audio file or direct a web browser to an Internet web page.

Developing the article of jewelry 10 required overcoming technical challenges with respect to combining NFC technology, metals, and conventional jewelry design. For instance, it was found that housing an NFC chip 14 within an article of jewelry 10 completely encircled by a silver or gold bezel prevented communication between the NFC chip 14 and an NFC enabled device. Since many articles of jewelry 10, such as pendants hanging from necklaces or bracelets, are traditionally formed with a gold or silver bezel 22 it was believed an NFC chip 14 could not be housed in such articles of jewelry 10. Therefore it was believed that the bezel 22 must be formed from an electrically nonconductive material, such as a plastic. However, surrounding a gemstone with a bezel 22 formed from a nonconductive material would be considered a cheap alternative in the jewelry field and would not be an acceptable substitution. It was unexpectedly found that communication between the NFC chip 14 and NFC enabled mobile device could be restored by removing the continuous nature of the silver or gold bezel 22 around the NFC chip 14. That is, by cutting the gold or silver bezel 22 to break the continuous nature of the NFC interfering loop, near field communication with the housed NFC chip 14 could be reestablished. Therefore it was surprisingly found that providing a small gap of only about a millimeter between opposing ends 22a, 22b of an open ended bezel 22 would permit NFC communication.

However, technical challenges still remained in that jewelry is traditionally hung from metal chains and mounted to metallic bands. The addition of a silver or gold chain against the silver or gold bezel 22 again formed a continuous loop and prevented communication with the NFC chip 14. To this end, additional development was required to isolate the silver or gold chain from the silver or gold of the bezel 22. A new development involved flanging the opposing ends 22a, 22b of the silver or gold bezel 22 outward, drilling a throughbore 24a, 24b through each flanged end 22a, 22b and inserting within each throughbore 24a, 24b a collar 26a, 26b formed from a nonconductive material thereby preventing direct contact between the silver or gold of the chain and silver or gold of the bezel 22. This configuration again permitted NFC communication. As such, a configuration was developed where a bezel 22 is formed from a highly electrically conductive material, such as silver or gold, but lacks a NFC interfering loop. This development permits communication with the housed NFC chip 14.

The article of jewelry 10 is configured to operate using near field communication at a maximum of only a few centimeters or less, thereby permitting near field communication between the article of jewelry 10 and a closely positioned NFC enabled device. Preferably, communication between the NFC chip 14 and NFC enable device occurs selectively within 10 cm, more preferably within 2 cm. By limiting the distance of communication, messages or expressions can be shared privately without concern of foreign NFC enabled devices outside of the communication distance. This is particularly useful when writing or retrieving personal messages or communications in areas of high population density, such as while on a bus or shuttle service, subway, train, in a crowded restaurant or other areas where NFC enabled devices can be found in high density. In addition, by providing such a short distance of communication the likelihood of overwriting the NFC memory by others, whether intentional or not is significantly reduced. In some instances, two or more jewelry articles 10, each embedded with a NFC chip 14 are arranged along a strand to form a necklace or bracelet at a distance that permits selective communication with each article of jewelry 10 and a same NFC enable device.

Figure 1:
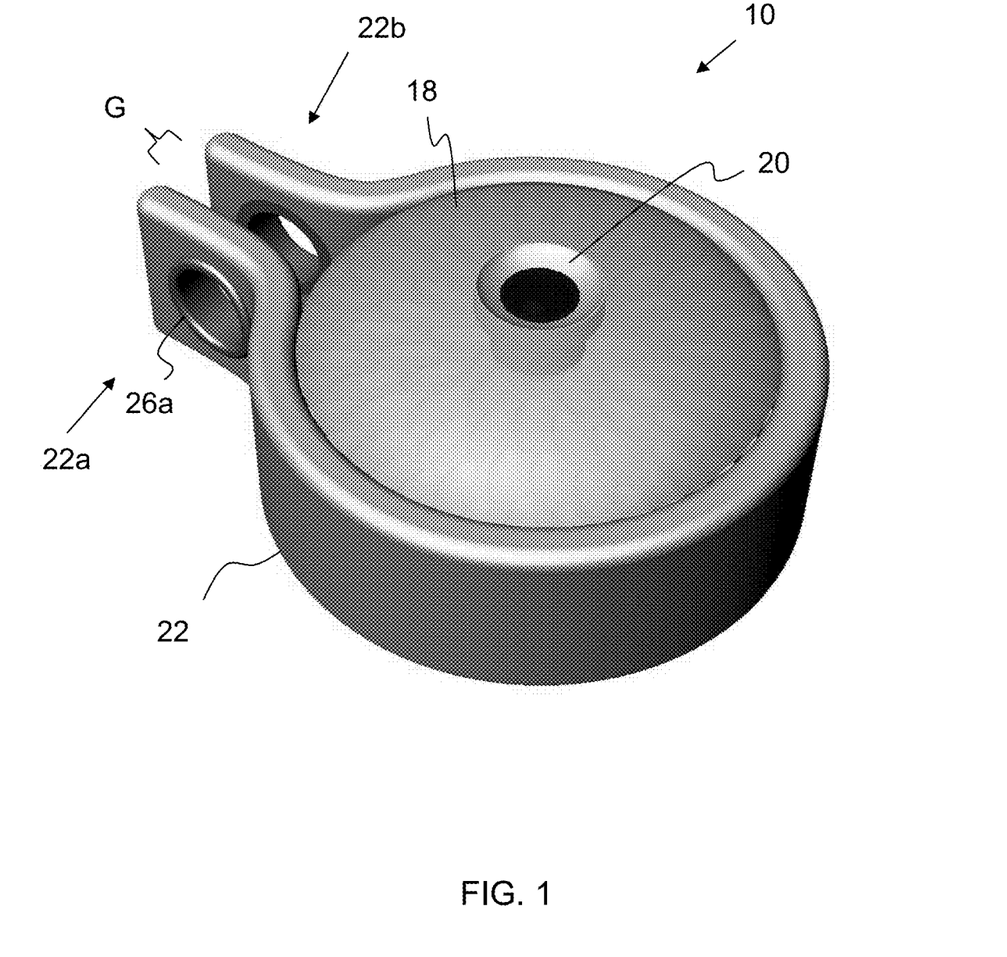
FIG. 1 is a perspective view showing a preferred article of jewelry with a hidden NFC chip.
Figure 2:
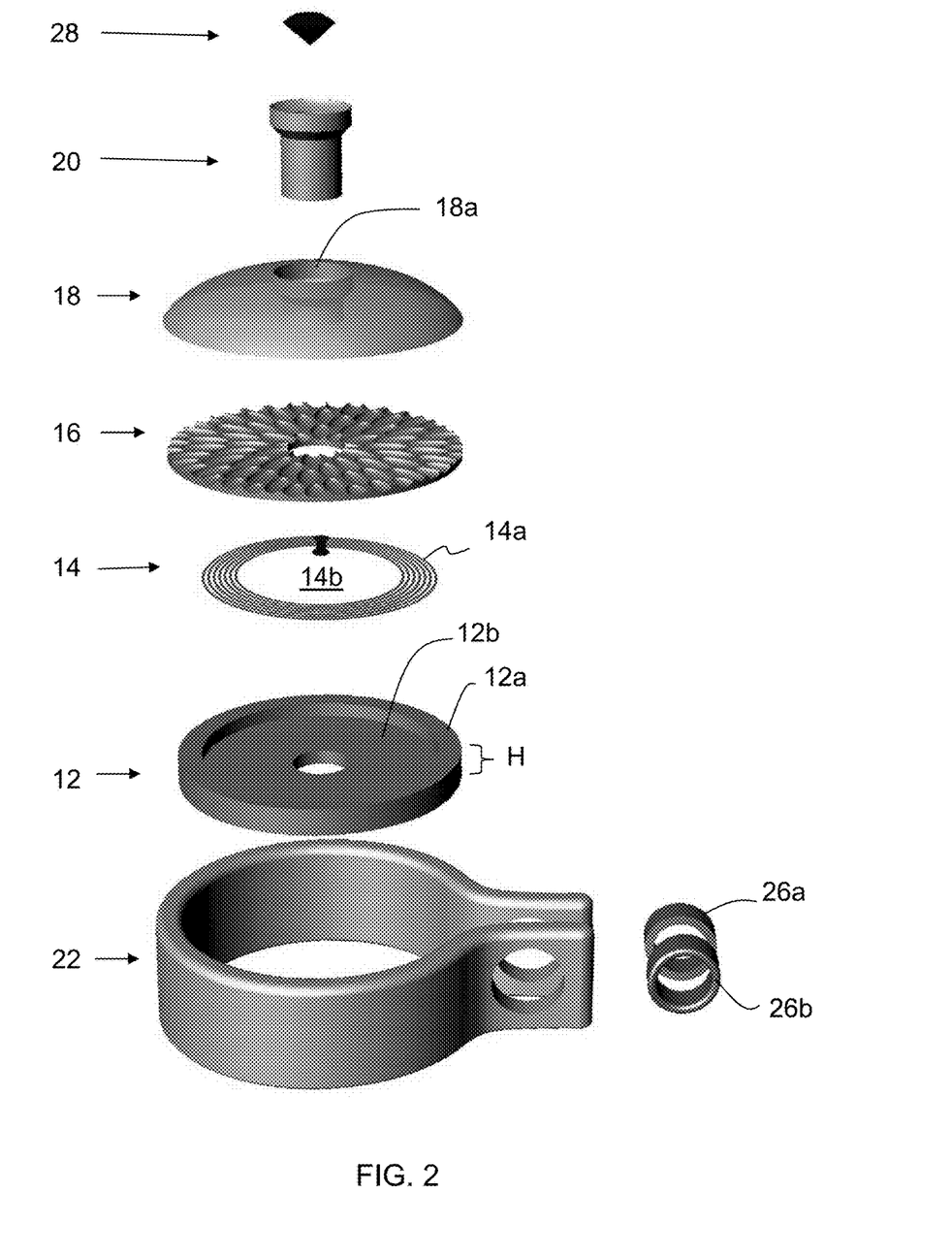
FIG. 2 is an exploded view showing the elements forming the article of jewelry of FIG. 1.
Figure 3:
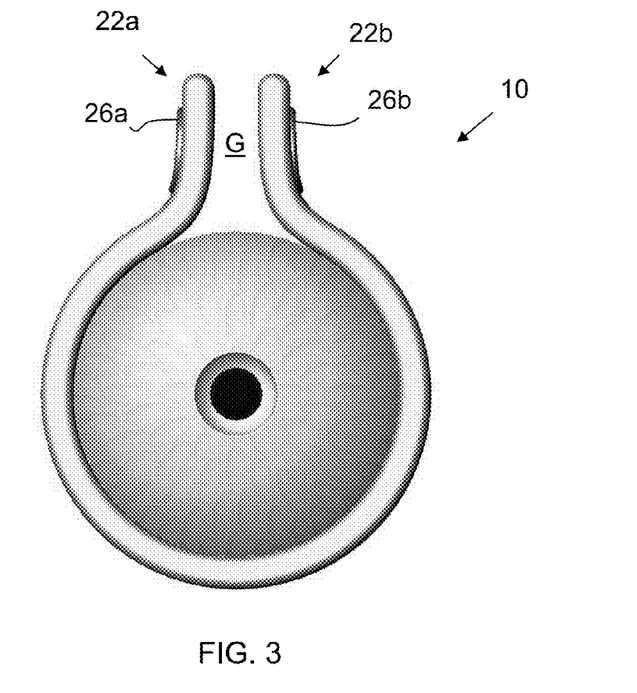
FIG. 3 is a front view of the article of jewelry shown in FIG. 1.
Figure 4:
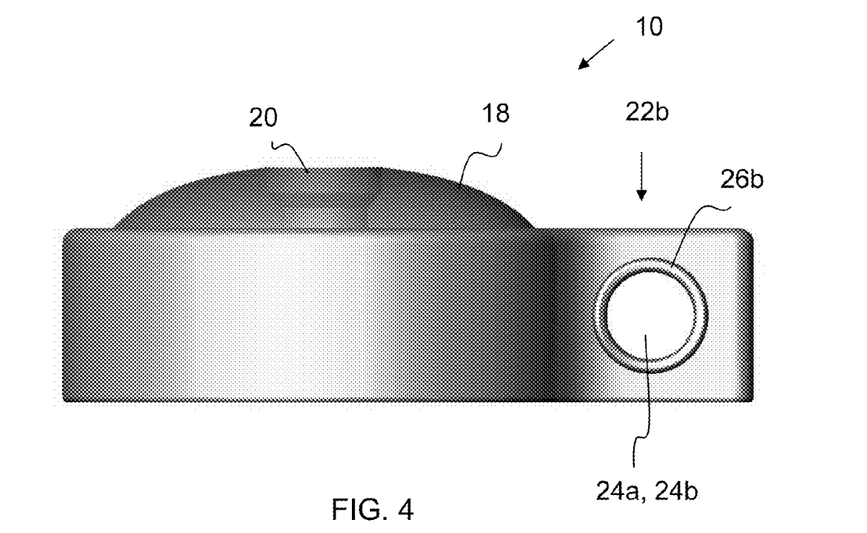
FIG. 4 is a side view of the article of jewelry shown in FIG. 1.

As shown in exploded form in FIG. 2, preferably the NFC chip 14 is configured as a plurality of circular rings 14a that surround a hollowed center 14b. By providing a hollowed center 14b, the gemstone 18 covering, the upper layer 16, and lower layer 12 can be safely drilled at about the center; and a gemstone setting 20 can be safely inserted to the region of the NFC chip 14 without risking damage to the NFC chip 14 itself. As such, a variety of gemstone settings 20 can be used with varying lengths as desired by the user or manufacturer.

The near field communication (NFC) chip 14 is housed or sandwiched between a lower 12 and an upper layer 16. Preferably, the upper layer 16 and lower layer 12 are affixed to one another to form the housing thereby minimizing mechanical forces applied to the fragile NFC chip 14, and thus further preventing a break in the circular rings 14a. In some embodiments, the perimeter 12a of the lower layer 12 is raised to form an ascending skirt or ridge that encircles a planar cavity or recess 12b for mounting the NFC chip 14. In this configuration, the NFC chip 14 is recessed below the height H of the ridge and the ridge forms a surface for adhering the upper layer 16. The NFC chip 14 may be secured to the lower layer 12 using an adhesive, such as double sided tape or glue. In another approach, the lower layer 12 is formed from a polymer and prior to curing or during hardening, the NFC chip 14 is layered over the polymer such that the lower layer 12 hardens or cures while the NFC chip 14 is present for casting integral to the lower layer 12. This can be accomplished by adding the NFC chip 14 to a cooling polymer melt or adding the NFC chip 14 together with or after adding a hardening catalyst as known in the polymer arts. Suitable, non-limiting examples of polymers include polyethylene terephthalate (PET) and polypropylene.

The upper layer 16 is preferably planar, layered over the NFC chip 14 and is preferably affixed to the lower layer 12, such as along the ridge the follows the outer perimeter 12a. The upper layer 16 is opaque and therefore prevents users from visually identifying the NFC chip 14. In other embodiments the upper layer 16 is recessed within the recess 12b or mounting surface and flush or about flush with top of the ascending skirt or ridge. As such the circumference of the upper layer 16 is preferably equal to or less than the circumference of the lower layer 12. In preferred embodiments, the upper layer 16 also adds to the desirability of the jewelry 10 by itself being formed from a precious or semiprecious material that can be viewed at least partially through the transparent or semi-transparent outer gemstone 18 covering. In some embodiments, the upper layer 16 is a planar slice of an opaque gemstone, such as an agate. In a preferred embodiment, the upper layer 16 is formed from mother of pearl.

A gemstone 18 provides a covering over the upper layer 16 and is preferably formed from a transparent or semi-transparent gem. The gemstone may be a precious gem or a semiprecious gem. In some embodiments the gemstone is selected from the group consisting of an amethyst, an aquamarine, an apatite, a citrine, an emerald, a garnet, a quartz, a iolite, a moissanite, a peridot, a ruby, a sapphire, a tanzanite, a topaz, and a zircon. Preferably the bottom of the gemstone 18 is flat to provide a complementary surface for good adhesion to the underlying upper layer 16 and/or optionally the lower layer 12. In some embodiments, the gemstone 18 is faceted. In other embodiments, the gemstone 18 is smooth and not faceted.

In preferred embodiments the gemstone 18 is drilled to provide a bore 18a for insertion of a gemstone setting 20. Preferably the bore 18a permits insertion of the gemstone setting 20 but prevents the gemstone setting 20 from sliding entirely through the gemstone 18. This can accomplished by providing bores 18a of varying diameter one within the other. The gemstone setting 20 is preferably glued into the bore(s) 18a using a jeweler's adhesive.

In preferred embodiments a second gemstone 28 is mounted to the gemstone setting 20. Non-limiting examples of suitable second gemstones 28 include precious and semi-precious gems. Further non-limiting examples include an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, a iolite, a jadeite, a kupzite, a lapis lazuli, a moon-stone, a malachite, a moamite, an onyx, an opal, a peridot, a red corundum, a ruby, a sardonyx, a sapphire, a spessar-time, a sphene, a spinel, a star ruby and sapphire, a sunstone, a tanzanite, a tiger eye, a tourmaline, a topaz, a turquoise, a tsavorite, and a zircon.

In furtherance of the above, the bezel 22 is formed to substantially encircle the NFC chip 14 by substantially encircling the upper 16 and lower layers 12 that form the housing. The bezel 22 extends along a same plane as the NFC chip 14 but also has a height that extends above and below the plane defined by the NFC chip 14. The bezel 22 is formed from a highly conductive material, such as silver or gold, which permits the efficient flow of electrical current. As indicated above, a challenge with using a highly electrically conductive metallic bezel 22 is that when completely encircling an NFC chip 14, communication between the NFC chip 14 and NFC enable device is lost. Accordingly, while the bezel 22 of the invention can be formed from metals and metal alloys, such as silver or gold, there is a technical challenge to overcome in that providing a continuous ring of such a material along the same plane and around the NFC chip 14 forms an NFC interfering loop, which prevents near field communication. However, it was surprisingly found that disrupting the continuous loop of a silver or gold bezel 22 resulted in successful communication between the NFC enabled device and NFC chip 14. To this end, in some embodiments, the bezel 22 is a noncontinuous ring comprising opposing ends 22a, 22b separated by a gap G. The gap G can be at least as small as 1 mm, with gaps G of 0.5 mm, 0.2 mm and smaller also being envisioned. In some embodiments the gap G is between 1 mm and 5 mm. Gaps G larger than 5 mm are also encompassed by the invention. In some embodiments, the gap G is 1 cm. In some embodiments the gap G can be 2.5 mm. In other embodiments, opposing ends or end regions of the conductive material are joined by a nonconductive material or a lesser conductive material that retains the ability to permit near field communication with the NFC chip.

To assist the artisan in selecting suitable materials TABLE 1 provides a listing of materials used in the jewelry arts and provides their corresponding electrical conductivity. As general guidance gold and silver, which are highly electrically conductive, can not themselves form a continuous bezel that permits near field communication. However, it was also found that opposing ends of a length of silver extending substantially but not completely around the outer perimeter of a housing could be joined by conventional jewelry grade titanium without loss of NFC signal. As such, highly conductive materials of about $10^7$ Siemens per meter (S/m) tend to require a gap between opposing ends to retain near field communication of a housed NFC chip. Lesser conductive materials of about $10^6$ S/m or less tend to be useful joining structures or covers and do not appear to interfere with near field communication of a housed NFC chip.

TABLE 1

| Material | Conductivity (S/m at 20° C.) |
|---|---|
| Silver | $6.30 \times 10^7$ |
| Copper | $5.96 \times 10^7$ |
| Gold | $4.10 \times 10^7$ |
| Aluminum | $3.50 \times 10^7$ |
| Tungsten | $1.79 \times 10^7$ |
| Zinc | $1.69 \times 10^7$ |
| Nickel | $1.43 \times 10^7$ |
| Iron | $1 \times 10^7$ |
| Platinum | $9.43 \times 10^6$ |
| Tin | $9.17 \times 10^6$ |
| Carbon steel | $6.99 \times 10^6$ |
| Titanium | $2.38 \times 10^6$ |
| Stainless steel | $1.45 \times 10^6$ |
| Glass | $1 \times 10^{-11}$ to $10^{-15}$ |
| Rubber | $1 \times 10^{-14}$ |
| Fused quartz | $1.30 \times 10^{-18}$ |

Figure 5:
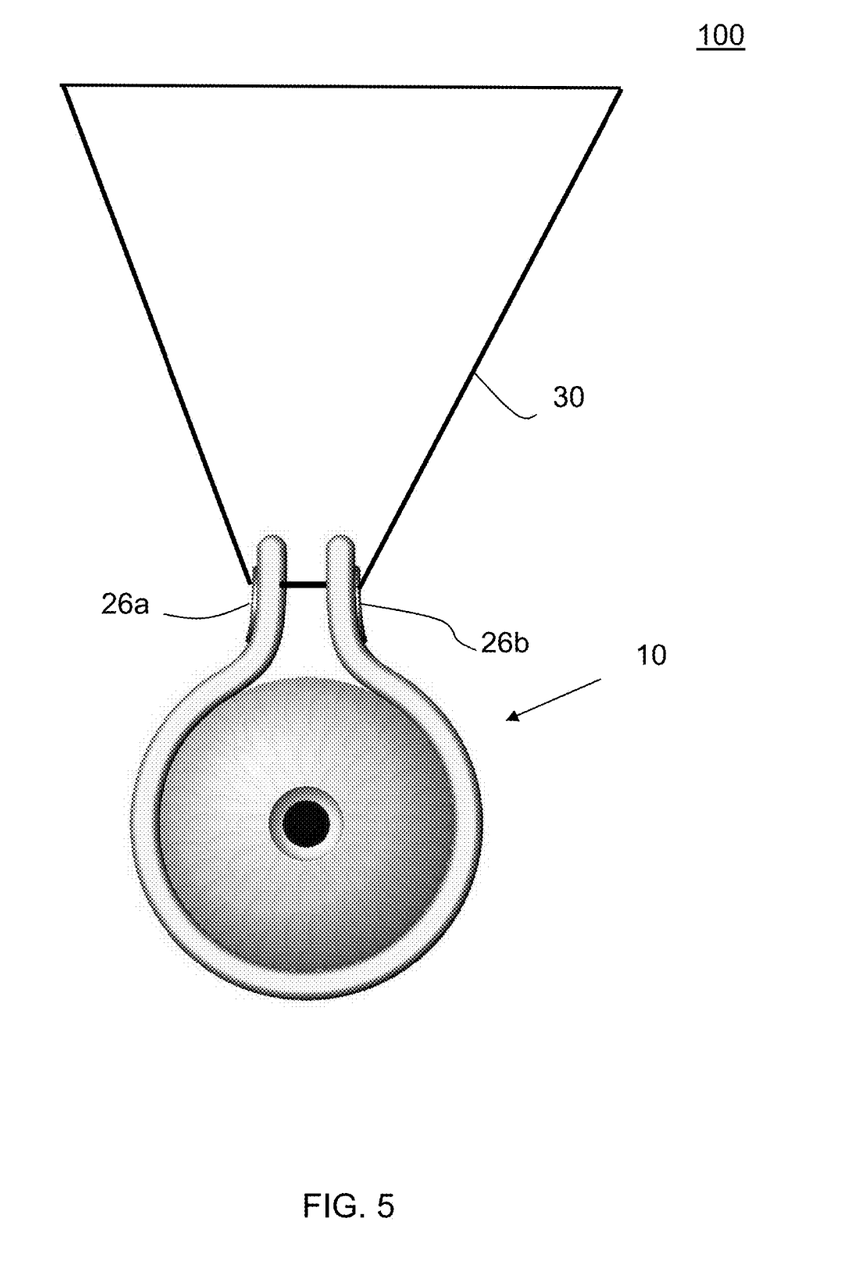
FIG. 5 depicts the article of jewelry shown in FIG. 1 embodied as a necklace.
Figure 6:
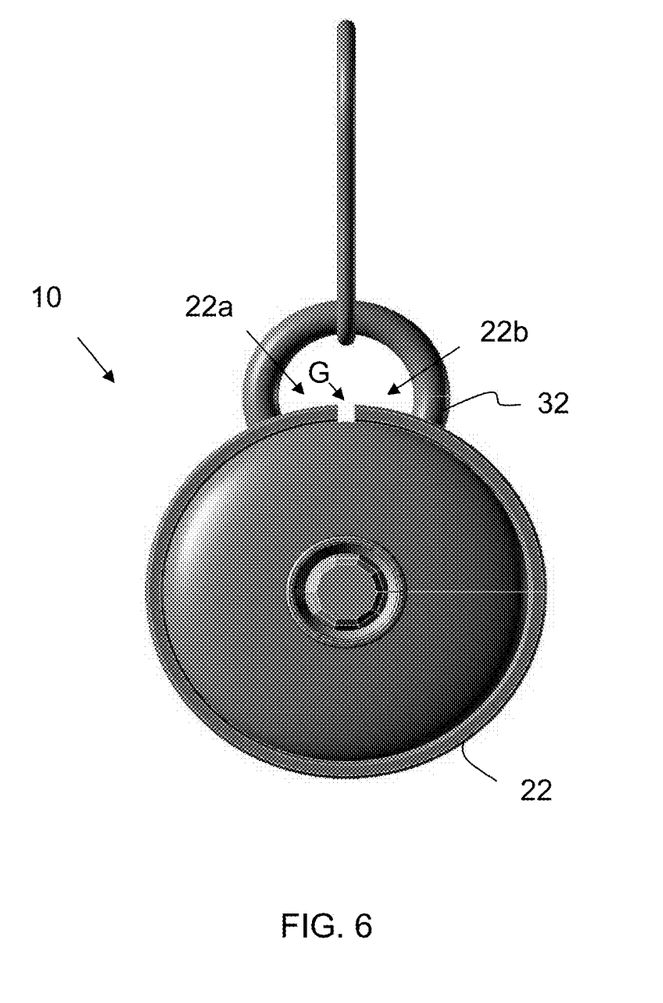
FIG. 6 is front view of another embodiment of an article of jewelry having a hidden NFC chip.

As such, a preferred embodiment is shown in FIGS. 1-4, where opposing ends 22a, 22b of the highly electrically conductive bezel 22, namely silver or gold, are flanged outward and each opposing flanged end 22a, 22b includes a throughbore 24a, 24b and lining each throughbore 24a, 24b is a collar 26a, 26b formed from a lesser conductive material, such as plastic. Lining throughbores 24a, 24b with collars 26a, 26b can be achieved using conventional jeweler's adhesive. As shown in FIG. 5, once the collars 26a, 26b are inserted, the article of jewelry 10 can be strung with a gold or silver chain 30 to form a necklace 100. Alternatively, as shown in FIG. 6, the jewelry article 10 can be configured for hanging by incorporating a lesser conductive material, such as titanium or titanium alloy as a joining structure 32 to join the bezel 22 near its opposing ends 22a, 22b. Metal alloys, such as titanium alloys can include one or more alloying elements such as aluminum, vanadium, iron, oxygen, palladium and others.

Figure 7:
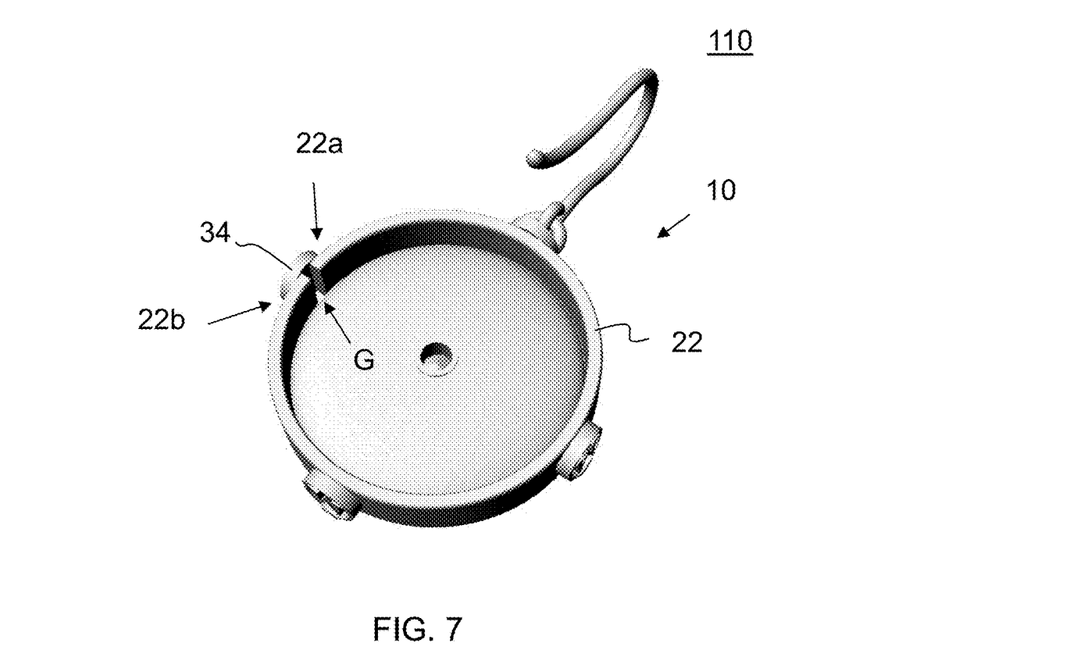
FIG. 7 is a rear view of an earring having a hidden NFC chip.
Figure 8:
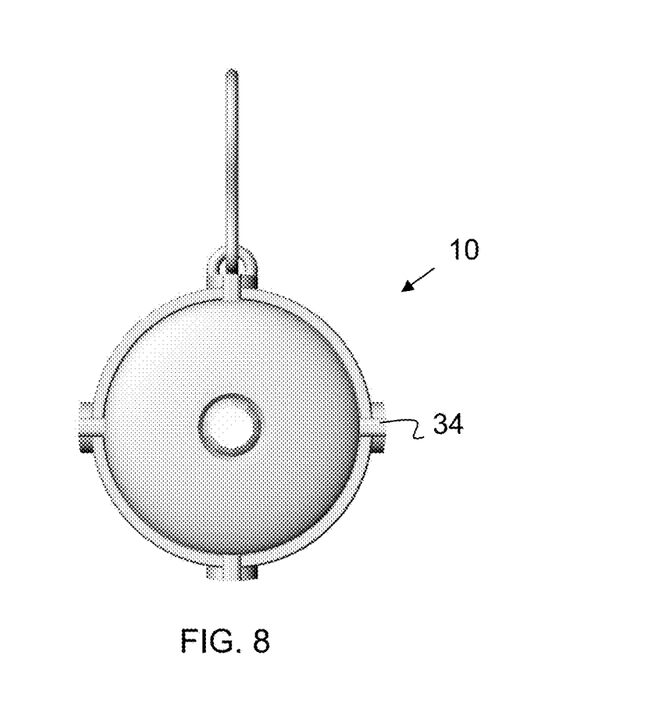
FIG. 8 is a front view of an earring having a hidden NFC chip.

In still another embodiment is depicted generally in FIGS. 7-8, where an article of jewelry 10 is configured in the form of an earring 110 and has a silver or gold bezel 22 with opposing ends 22a, 22b that are separated by a gap G. More specifically, FIG. 7 is a rear view showing the gap G and a gap covering 33 formed from titanium alloy that connects opposing ends 22a, 22b. A front view is shown in FIG. 6, where a lesser conductive material such as titanium or titanium alloy provides a second gap covering 34 that covers the gap G from appearance.

Figure 9:
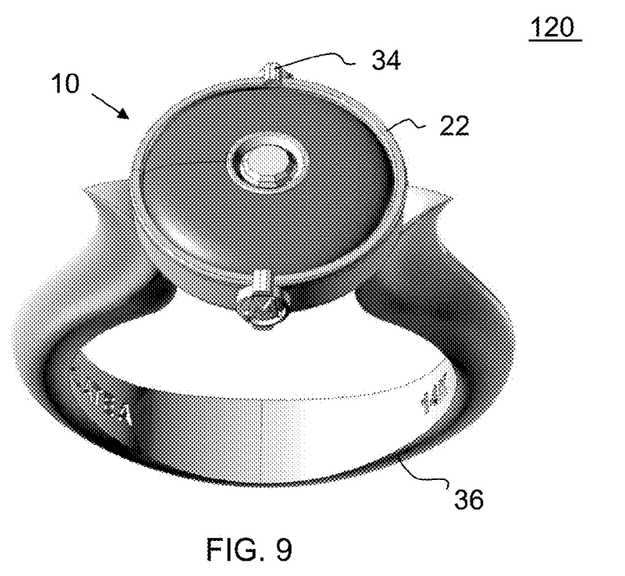
FIG. 9 is an elevated top, front view of a ring having a hidden NFC chip.
Figure 10:
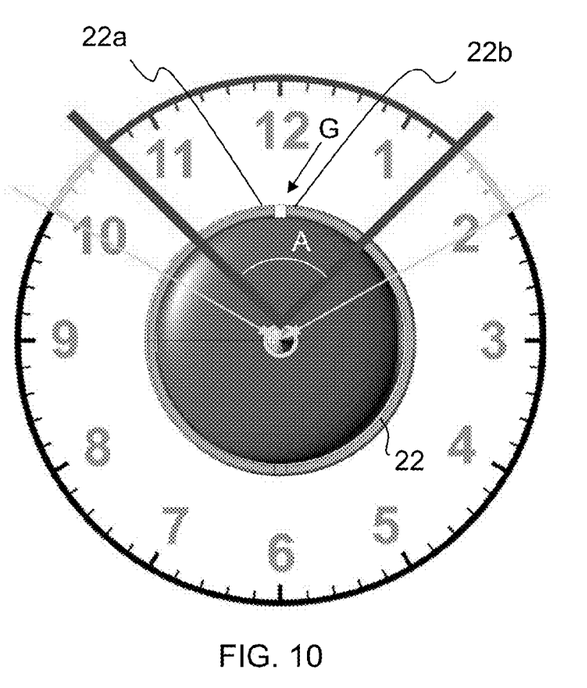
FIG. 10 is an image of an article of jewelry overlaying a clock for reference.

Another embodiment is depicted in FIG. 9, where the article of jewelry 10 is in the form of a ring 120 having a silver or gold bezel 22. Also show is a gap covering 34. Providing the article of jewelry 10 in the form of a ring 120 represents another set of challenges. Rings 120 are conventionally formed with hoops 36 made from highly conductive materials such as gold or silver. It was envisioned that a gold or silver hoop 36 would again establish an NFC interfering loop; however, as show in FIG. 10, where the gap G is positioned relatively at 12 o'clock, as long as the pair of connections of the hoop 36 to the bezel 22 were outside of the angle A formed between about 10:30 and 1:30, or more reliably between about 10 and 2 o'clock, NFC communication could be maintained.

Accordingly, the skilled artisan will appreciate that the article of jewelry 10 can be adapted for use in a variety of forms, including a pendent for a necklace 100 or charm for a bracelet, an earring 110, a ring 120 and other forms of jewelry.

The invention described herein may be embodied in other specific forms without departing from the spirit or essential characteristics thereof. The specific embodiments previously described are therefor to be considered as illustrative of, and not limiting, the scope of the invention.

What is claimed is:

1. An article of jewelry comprising:
    a) a housing that permits passage of a near field communication signal, the housing characterized as having a lower layer joined to an upper layer;
    b) a near field communication (NFC) chip housed within the housing;
    c) a gemstone covering the upper layer of the housing; and
    d) a bezel formed from a highly electrically conductive material positioned on a same plane as the NFC chip and surrounding the outer perimeter of the housing except for a single gap permitting near field communication with the NFC chip, wherein the bezel has opposing ends that are flanged outward and spaced apart to define the gap between the ends, and further wherein each end comprises a throughbore lined with a nonconductive collar.

2. The article of jewelry according to claim 1, wherein the upper layer comprises mother of pearl and the gemstone is a transparent or semitransparent.

3. The article of jewelry according to claim 1, wherein the gemstone is selected from the group consisting of an amethyst, an aquamarine, an apatite, a citrine, an emerald, a garnet, a quartz, a iolite, a moissanite, a peridot, a ruby, a sapphire, a tanzanite, a topaz, and a zircon.

4. The article of jewelry according to claim 1, wherein the highly electrically conductive material is silver.

5. The article of jewelry according to claim 1, wherein the highly electrically conductive material is gold.

6. The article of jewelry according to claim 1, further comprising a joining structure joining opposing ends of the bezel, wherein the near field communication with the NFC chip is permitted when the joining structure joins the opposing ends.

7. The article of jewelry according to claim 1, further comprising a chain formed from gold or silver that is threaded through the opposing throughbores and separated from direct contact with the highly conductive material of the bezel by the collars.

8. The article of jewelry according to claim 1, wherein the gemstone comprises a throughbore through which a gemstone setting extends.

9. The article of jewelry according to claim 8, further comprising a second gemstone, wherein the second gemstone is mounted in the gemstone setting for display.

10. The article of jewelry according to claim 9, wherein the second gemstone is selected from the group consisting of an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadeite, a kupzite, a lapis lazuli, a moonstone, a malachite, a moamite, an onyx, an opal, a pearl, a peridot, a red corundum, a ruby, a sardonyx, a sapphire, a spessartime, a sphene, a spinel, a star ruby and sapphire, a sunstone, a tanzanite, a tiger eye, a tourmaline, a topaz, a turquoise, a tsavorite, and a zircon.

11. The article of jewelry according to claim 1, wherein the bezel surrounds at least 85% and less than 100% of the outer perimeter of the housing.

12. The article of jewelry according to claim 1, wherein the opposing ends of the bezel are free from contact with one another.

\* \* \* \* \*